US007311248B1

(12) United States Patent
Halvorson et al.

(10) Patent No.: US 7,311,248 B1
(45) Date of Patent: Dec. 25, 2007

(54) METHOD AND SYSTEM FOR AUTOMATICALLY DETECTING FRAUDULENT APPLICATIONS

(75) Inventors: Douglas Halvorson, Omaha, NE (US); Shelley L. Moore, Omaha, NE (US)

(73) Assignee: Prairie Systems, Inc., Omaha, NE (US)

( * ) Notice: Subject to any disclaimer, the term of this patent is extended or adjusted under 35 U.S.C. 154(b) by 326 days.

(21) Appl. No.: 10/916,707

(22) Filed: Aug. 12, 2004

(51) Int. Cl.
*G06K 5/00* (2006.01)
(52) U.S. Cl. .......................... 235/382; 705/4; 705/38; 705/44; 705/50; 705/64; 705/75
(58) Field of Classification Search ............... 235/382; 705/4, 38, 44, 50, 64, 75
See application file for complete search history.

(56) References Cited

U.S. PATENT DOCUMENTS

| | | | | |
|---|---|---|---|---|
| 2003/0144950 | A1* | 7/2003 | O'Brien et al. ............ | 705/38 |
| 2004/0258281 | A1* | 12/2004 | Delgrosso et al. .......... | 382/115 |
| 2005/0021476 | A1* | 1/2005 | Candella et al. ........... | 705/64 |
| 2005/0108063 | A1* | 5/2005 | Madill et al. .............. | 705/4 |
| 2005/0144143 | A1* | 6/2005 | Freiberg ................... | 705/75 |
| 2006/0101508 | A1* | 5/2006 | Taylor ...................... | 726/7 |

* cited by examiner

*Primary Examiner*—Michael G. Lee
*Assistant Examiner*—Allyson N Trail
(74) *Attorney, Agent, or Firm*—Holland & Hart

(57) ABSTRACT

A system and method are provided for automatically detecting fraudulent applications. The system receives application data from one or more clients and compares the application data with an identification database, such as a database maintained by list providers. The system contacts each applicant to confirm the applicant's identity and whether or not the applicant filed the application. The system allows applicants to confirm contact information and directs applicants to a client call center for reporting fraudulent activity or erroneous information. The system may leave information enabling the applicant to contact the system and/or a client call center to verify the applicant's identity and whether or not the applicant filed the application based on the client's business logic.

11 Claims, 4 Drawing Sheets

METHOD AND SYSTEM FOR AUTOMATICALLY DETECTING FRAUDULENT APPLICATIONS

BACKGROUND OF THE INVENTION

1. Field of the Invention

The present invention relates to systems used to detect fraudulent applications and more particularly to an automated system that detects fraudulent applications by first comparing information found within the application with a separately maintained database of contact information and then contacting the applicant to confirm that the application is valid.

2. Description of the Prior Art

Over the years, identity theft has become the top consumer complaint reported to authorities, according to the Federal Trade Commission. The electronic age of information has provided faster electronic communications and greater access to a wide range of personal information. Moreover, in response to various economic conditions and consumer spending trends, businesses have provided greater access to credit. These and other factors have caused the incidence of application fraud to dramatically increase.

Typical application fraud may be limited in scope, where someone obtains an individual's personal information, such as the individual's name, address, social security number, mother's maiden name and other such information in order to fraudulently open a credit card account. Other incidences of fraud can be much more broad in scope. For example, a group may attempt to defraud hundreds of creditors using fictitious applicant information to obtain credit and other services offered through publicly disseminated applications. Overall, application fraud costs businesses across the world several billion dollars each year. These losses are typically passed to the consumers, by way of higher prices and fees for many different goods and services.

Various organizations and businesses have developed methods of fighting losses due to application fraud. The difficulty comes in associating the identity and credit file of an individual with the identity being presented in the application. Many prior art methods require manual security and credit checks. However, such manual checks are prone to human error, and even when accurate, become costly expenditures of time and money. Some prior art methods use complex statistical models and trends in an attempt to make an educated guess as to whether or not an application is fraudulent. Other prior art methods include a heavy reliance on credit bureaus and other fraud information services. However, the databases maintained in these systems may be updated sporadically and, oftentimes, it may take weeks or months for reported problems or incidences of fraud to appear in the databases.

Accordingly, what is needed is an automated system and method for determining fraudulent applications that automatically compares application data with an accurate identification database that is continuously updated. Such a system should also provide an automated manner of contacting the applicant to verify the applicant's identity and that it was the applicant who submitted the subject application. However, such as system should be capable of updating its own database and connecting the applicant with a live customer service representative to rectify database irregularities or report a potentially fraudulent application.

SUMMARY OF THE INVENTION

An automated system for detecting fraudulent applications among a plurality of applications filed by one or more applicants is generally provided with a central server, having at least a processor, a data storage medium, and a means for accessing a network, such as the Internet or a publicly switched telephone network (PSTN). The processor is operatively coupled with an identification database having the names of individuals and their current contact information.

Software is provided to be operative on the processor for receiving application data from one or more clients. The application data is compared with the identification database. The system determines whether or not the application data for the applicant matches data within the identification database. The central server then attempts to contact each applicant in order to verify their identities and whether or not they submitted the applications being reviewed. If the applicants fail to verify themselves as the individual identified on the applications, the system provides the applicants with call back information so they can confirm whether or not they filed the applications. If the applicants verify that they are the individuals identified on the applications, the system gives them an opportunity to confirm whether or not they filed the applications. Where an applicant indicates that they did not file the application, the system may transfer the connection to a live representative at the client's call center. When the application data does not match the data within the identification database, applicants are given an opportunity to confirm the correct contact information for use by the client.

It is therefore a principle object of the present invention to provide an automated system for detecting fraudulent applications by comparing application data with a separate identification database and then confirming the application with the applicant directly.

A further object of the present invention is to provide an automated system that detects fraudulent applications by comparing application data with a separate identifier database and then confirming the application with the applicant using voice automation.

Still another object of the present invention is to provide an automated system that detects fraudulent applications by comparing application data with an identification database maintained by at least one list service provider.

Yet another object of the present invention is to provide an automated system for detecting fraudulent applications that is cost effective and relatively simple to implement.

A further object of the present invention is to provide a system for detecting fraudulent applications that may be used with nearly any application process used by a wide range of businesses and organizations.

Still another object of the present invention is to provide an automated system for detecting fraudulent applications that effectively directs only those applications having a high probability of fraudulent activity or application error to call center personnel in order to more efficiently validate application data.

These and other objects of the present invention will be apparent to those skilled in the art.

DESCRIPTION OF THE PREFERRED EMBODIMENT

In the following detailed description of exemplary embodiments, reference is made to accompanying FIGS. 1-4, which form a part hereof and show by way of illustration exemplary embodiments that may be implemented in order to practice the invention. These embodiments are disclosed in sufficient detail to enable those skilled in the art to practice the invention. It is to be understood that other embodiments may be utilized, however, and other changes may be made, without departing from the spirit or scope of the present invention. The following detailed description is, therefore, not to be taken in a limiting sense, and the scope of the present invention is defined only by the appended claims.

Figure 1:
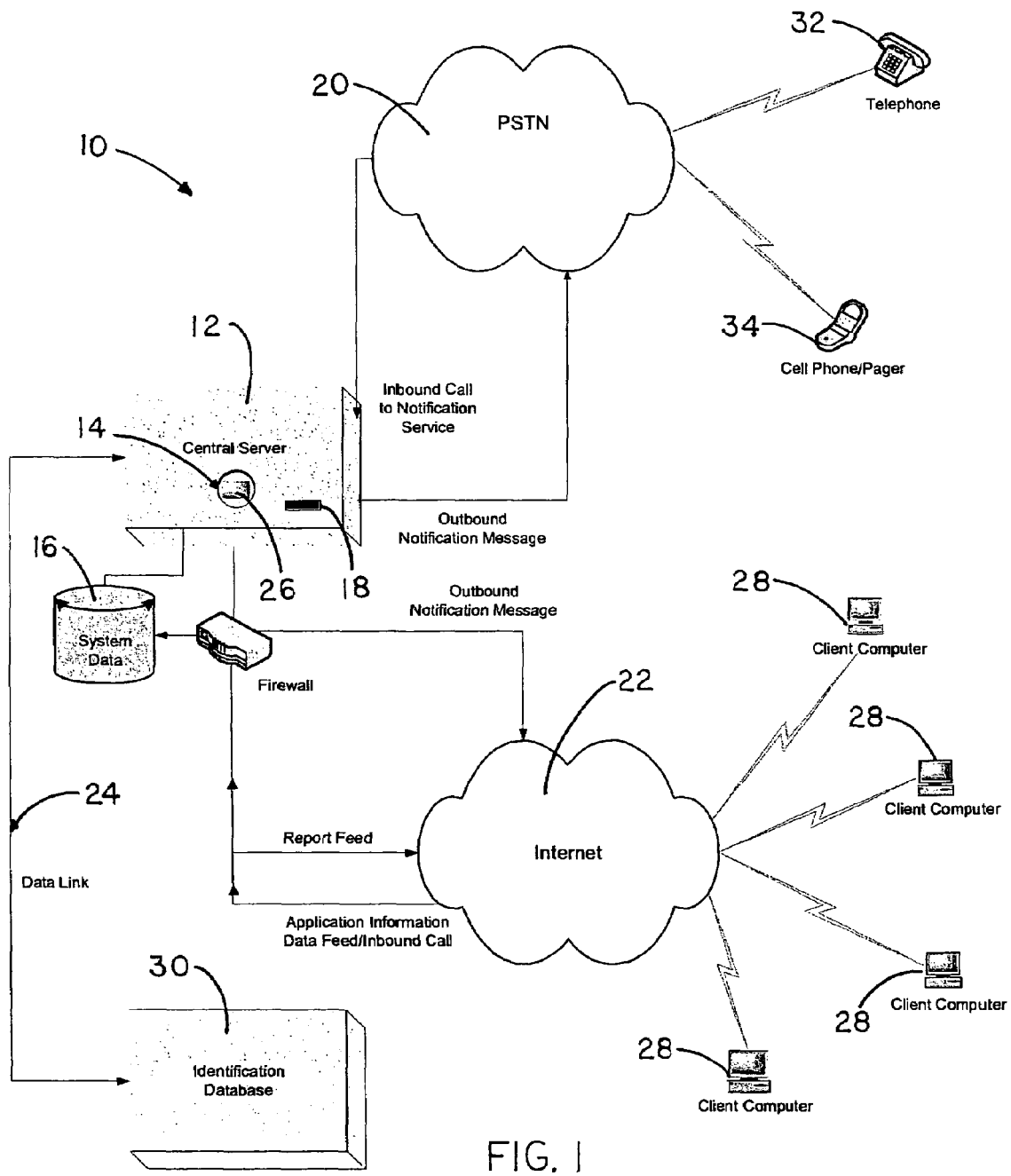
FIG. 1 depicts a general schematic of one possible embodiment of the system of the present invention.

FIG. 1 depicts a system level overview of one embodiment of the system and method for automatically detecting fraudulent applications of the present invention. The system 10 is generally comprised of a central server 12 having at least a processor 14, a data storage medium 16 and a means 18 (such as a modem, network card, or other similar interfacing device) for accessing a network, such as a publicly switched telephone network (PSTN) 20, the Internet 22, a limited environment intranet or data link 24. Regardless of the type of communications network accessed by the server 12, it is contemplated that the network connection could be made via land line or wireless connections.

Operating software 26 is provided to be operative on the processor 14. The software 26 enables the server 12 to receive application data from one or more applications, forwarded to the central server by one or more clients. It is contemplated that the application data could be received in virtually any form. For example, clients could transmit the application data from client computer devices 28, such as PC's, laptops, PDA's, and the like, over a network to which the server 12 is connected. It is contemplated that the application data could also be forwarded to the server 12 by mailing or delivering data storage media, such as diskettes or CD's that are readable by the server 12 or a separate work station coupled with the server 12. The application data could also be scanned from a paper copy of the application or even entered manually at the server 12 or a workstation coupled thereto.

It will become clear to one having skill in the art that the system 10 will be beneficial for detecting fraudulent applications among applications of nearly any type, including applications for credit accounts, services, benefits, organization membership, and the like. Therefore, various portions of most applications will be irrelevant to the study of the application for potentially fraudulent activity. It is contemplated, however, that the system 10 may function on as little information as the applicant's name and contact information, such as a telephone number or residential address. In a preferred embodiment, all three pieces of information comprise the application data forwarded to the central server 12 by the clients. The software 26 operates to compare the application data received with an identification database 30, which may be maintained remotely by a third party vendor or maintained in-house. Regardless, the identification database 30 should be one that is placed in operative communication with the server 12. In a preferred embodiment, the identification database 30 is comprised of data having at least a plurality of individual names and contact information relating to each name. For example, one preferred identification database may be a national telephone database that is maintained by a third party vendor, who continuously updates the database with information from one or more residential telephone companies. Such a database is typically updated nightly for unparalleled accuracy and oftentimes is comprised simply of names and at least one telephone number and address associated with each such name. The software 26 takes each name and/or contact information from the application data and compares it to the names and/or contact information found within the identification database 30. The system 10 determines that a "match" has been found when at least two pieces of applicant information in the application data, such as a name and one piece of contact information or two pieces of contact information, data are found to be identical to two such pieces of information for an individual in the identification database 30. The results of this comparison, as well as portions of the application data or identification database 30 may be stored, at least temporarily, on the data storage medium 16.

Figure 2:
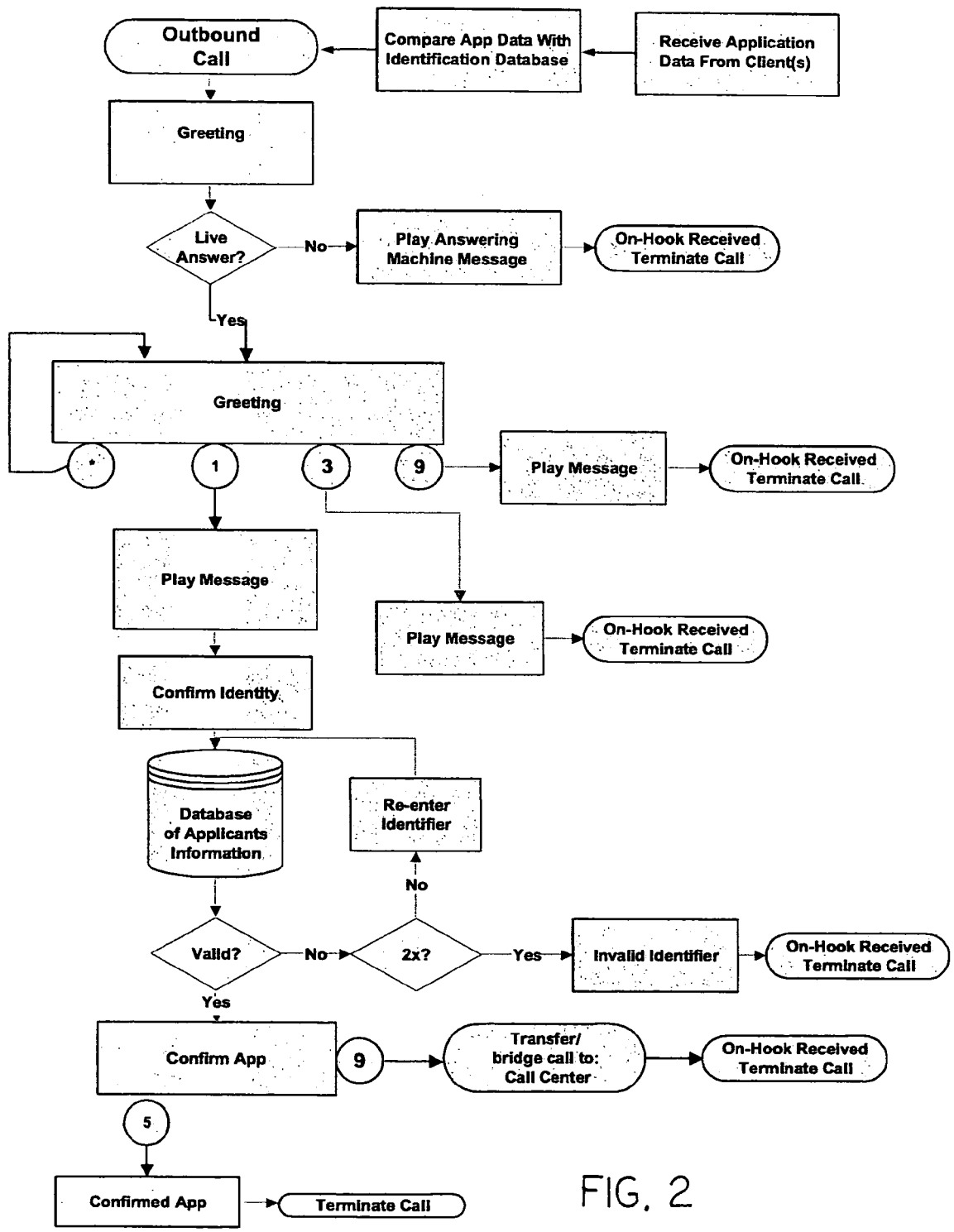
FIG. 2 is a block digram which demonstrates one manner in which the system of the present invention may be used to verify the validity of an application.
Figure 3:
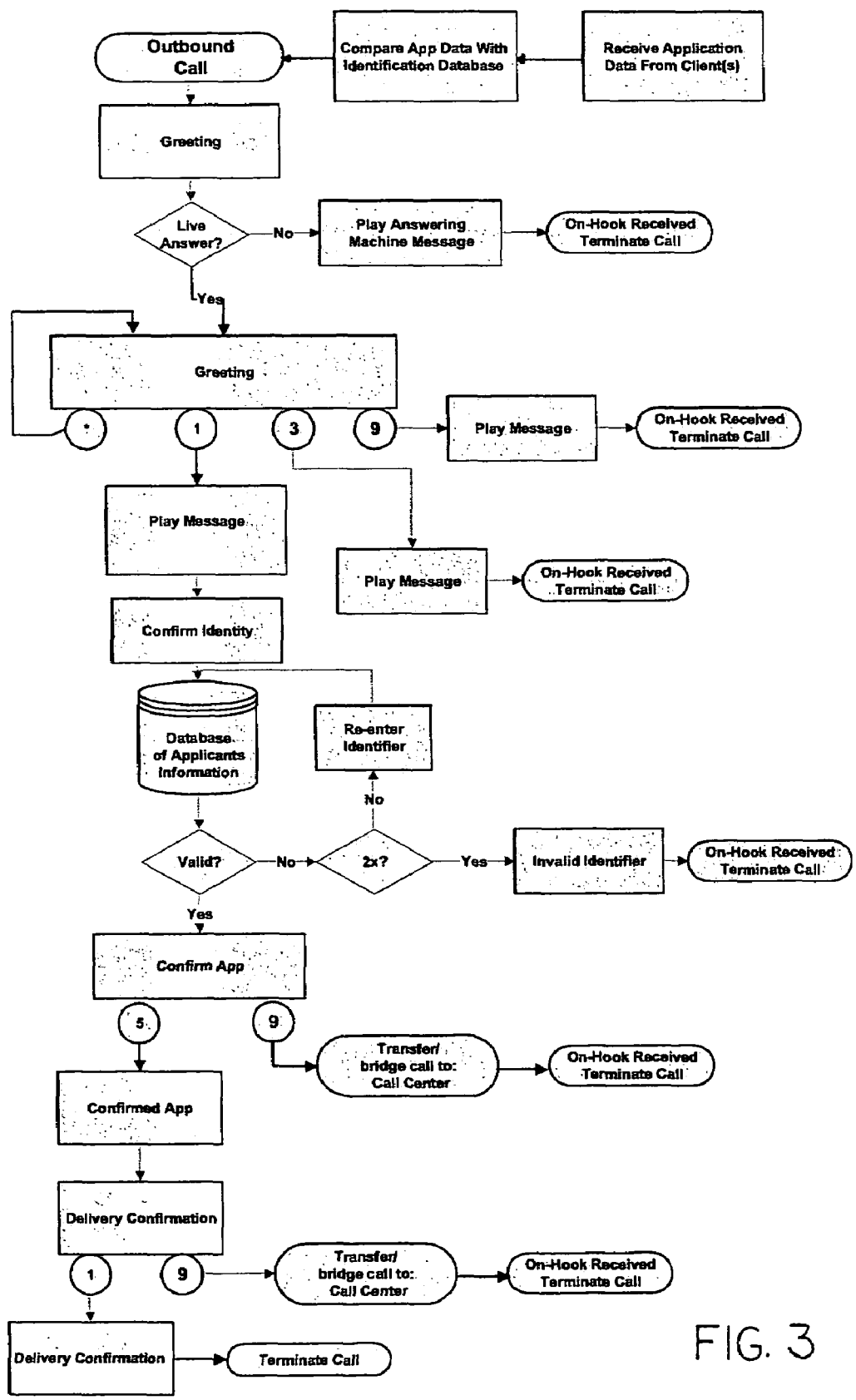
FIG. 3 depicts a block diagram which demonstrates one manner in which the system of the present invention may be used to verify the validity of an application and further verify an applicant's contact information.

FIGS. 2 and 3 depict two possible examples of the system 10 in operation. In both Figures, the system begins with the collection of the application data from one or more clients. The application data is compared with the identification database 30, where the system 12 determines whether or not application data from each application can be matched with a name and/or contact information within the identification database 30. The system 10 then accesses a network to contact each applicant. FIGS. 1-3 depict examples where the network is a PSTN and the server 12 is attempting to contact each applicant using the applicant's telephone 32 or other communications device 34, such as a cell phone, paging device or PDA. It is also contemplated that the applicant can be contacted over the Internet, or a data link, where an applicant's computer device is to be contacted. In the examples depicted, the system 10 places an outbound call using the applicant's contact information. The software 26 is operative to wait for the line to go off the hook, wherein an audible (or visual, depending upon the applicant device being contacted) greeting, such as, "This is an important call from the Fraud Prevention Department of First Prairie Bank." The software 26 is operative to receive a response from the applicant, such as DTMF tones, voice, or other format of data transmission from the applicant. Where no response is received by the system 10, a message may be left, such as "This is the First Prairie Bank calling for Jane Doe. Please call 1-800-888-3151. Thank you. Good bye." The system 10 may then simply wait for the line to go on the hook and terminate the call. Where a response is received to the initial greeting, a secondary greeting may be provided by the system 10, such as "This is First Prairie Bank, calling for Jane Doe. If you are Jane Doe press 1, if Jane Doe is not available press 3, if Jane Doe is not at this number please press 9. If Jane Doe is available but they need a moment to come to the phone or you would like to repeat this menu, press the star key and then simply press the 8 key when Jane Doe is ready." The software 26 will be provided to recognize such specific responses and proceed accordingly. For example, where the star key is pressed, the greeting will simply play again. Where the number 3 is selected in this particular example, the system 10 may provide a message, such as "A First Prairie Bank customer security advisor is available to review your information 24 hours a day, seven days a week. Please ask Jane Doe to call us back at 1-800-888-3151. Thank you, Good bye." The system 10 then simply waits for the line to go on the hook, where the call is then terminated. Where the applicant selects the number 9, a message may be provided, such as "Thank you. We will update our records. Good bye." The system 10 will then terminate the call after detecting that the line is on the hook.

Where, in the present example, the applicant selects the number 1, the system 10 may provide a message similar to, "In our continued efforts to protect our customers from identification theft, we are calling to verify whether or not you recently submitted an application for a First Prairie Band credit cart." In a preferred embodiment, the software 26 is then operative to present an identity question to the applicant, using information provided by the client that is unique to the applicant, such as the applicant's social security number. In that example, the system 10 may ask the applicant to simply enter the last four digits of the applicant's social security number. The software 26 will receive the applicant's response and verify the response with the application data. Where the system 10 determines that the response does not match the application data, the software 26 requerys the applicant. Where continued incorrect responses are received by the system 10, the call may be terminated. However, where a correct response is received by the system 10, the system 10 may present an application question to the applicant by stating, for example, "For your protection, please take a moment to confirm whether you did submit an application to First Prairie Bank. If you authorize First Prairie Bank to continue to process your respect, press 5. If you did not authorize this request, press 9 and we will connect you to a fraud specialist." In this example, the software 26 is provided to recognize such responses provided by the applicant. For example, where the number 9 is selected by the applicant, the system 10 may transfer or bridge the communication to the client call center where a customer service representative or fraud specialist will take over the communication with the applicant in order to determine whether an application was fraudulently filed or there is simply an error on the application data. Where the applicant selects the number 5, the system may simply present a message to the applicant such as, "Thank you for confirming your application. We appreciate your interest and look forward to having you as a customer. Good bye." The system 10 then simply terminates the call.

The block diagram of FIG. 3 provides an additional possible step taken by the system 10, where no identical match can be found in the identification database 30 for any two pieces of information in the applicant's application data. In the depicted example, after confirming that the applicant did in fact file an application with the client, the applicant's contact information may be confirmed. For example, the system 10 could present the contact information from within the identification database 30 and ask if the applicant would like to use that contact information with the client. The applicant may be asked to, for example, press 1 if they would like to use the contact information presented to them by the system or press 9, if the applicant does not want to use that information. In the example provided, the system 10 may acknowledge that the applicant has selected the number 1 by stating "Thank you for confirming your address. We appreciate your interest and look forward to having you as a customer. Good bye." The system 10 could then simple terminate the call. However, where the applicant has selected the number 9, contact with the applicant could be transferred or bridged to the client call center to put the applicant in communication with a customer service representative to confirm the correct contact information.

Figure 4:
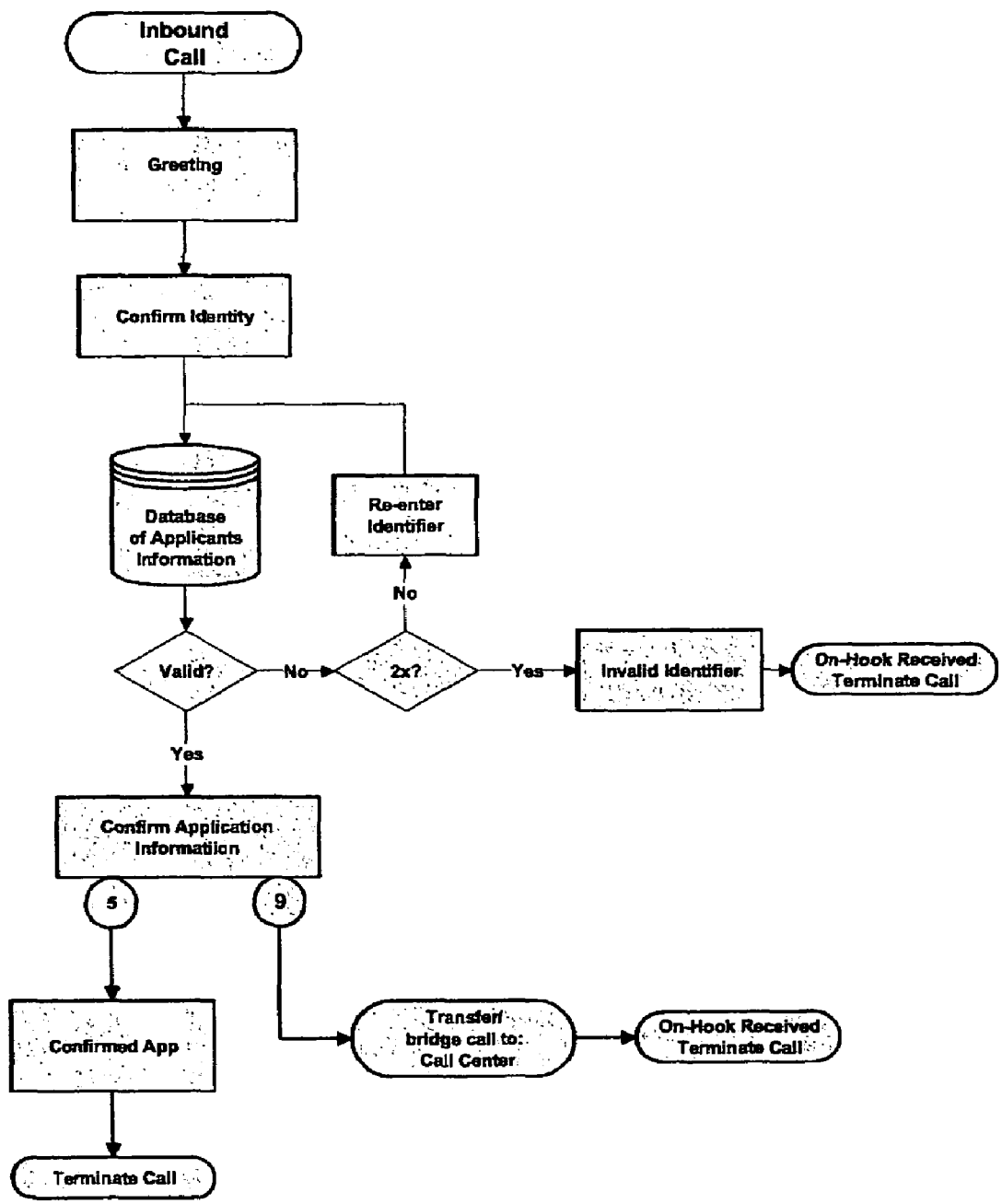
FIG. 4 depicts a block diagram which demonstrates one manner in which the system of the present invention may be used to permit an applicant to contact the system to verify the validity of an application in response to contact information, left previously for the applicant by the system.

FIG. 4 depicts a block diagram of one possible example where the applicant has received the reply contact information left by the system 10 and contacts the system 10 at a later time. Again, while the example is provided that the applicant places a call to the system 10 over the PSTN, other interfaces and networks are contemplated. As depicted however, the applicant calls the system 10, in which the software 26 is provided to direct the applicant through the routine discussed hereinabove. The applicant is presented with an identity question and then an application question, where the applicant's identity is confirmed. Where the applicant confirms that the application is valid, the system 10 may simply thank the applicant and terminate the call. However, the contact with the applicant may be transferred or bridged to the client call center to place the applicant in communication with a customer service representative, where the applicant replies that it did not submit the application to the client.

Data relating to the data comparisons and applicant contacts performed by the system 10 may be at least temporarily stored on the data storage medium 16, wherein the software 26 may be provided to formulate such data into individual reports to be provided to the clients. It is further contemplated that the clients could be provided with access to such data and reports over the network to which the server 12 is connected, such as the Internet 22 for example. When desirable, the software 26 may be provided to record the contact between the system 10 and the applicant, including questions and messages transmitted by the system 10 to the applicant and any responses received thereto. These recordings may be stored on the data storage medium 16 along with time and date information relating to each recording. The system 10 is preferably capable of replaying the recordings, transmitting copies of the recordings to clients, or generating reports based on the same.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. An automated system for detecting fraudulent applications among a plurality of applications filed by various applicants, comprising:
 a processor;
 a data storage medium operatively coupled with said processor that is capable of at least temporarily storing application data provided by one or more clients;
 an identification database comprising the names of individuals and contact information relating to said individuals; said identification database being operatively coupled with said processor;
 means for accessing a network operatively couple with said processor; and software operative on said processor to:
a) receive application data from one or more clients for at least one applicant;
b) compare the application data for said at least one applicant with said identification database;
c) determine whether or not said application data for said at least one applicant matches at least a portion of said identification database for at least one individual;
d) initiate contact with said at least one applicant over said network;
e) present said at least one applicant with an application question in an attempt to confirm whether or not said at least one applicant submitted an application to said client;
f) receive a response from said at least one applicant regarding said application question; and
g) ask said at least one individual to confirm contact information that should be used by said client, if the system first determines that said application data for said at least one applicant does not match a name and contact information within said identification database and the system has confirmed that said at least one applicant submitted an application to said client.

2. The system of claim 1 wherein said software is further operative to put said at least one applicant in communication with a customer service representative if said at least one applicant chooses to use contact information that is not provided within said application data or said identification database.

3. The system of claim 1 wherein said software is further operative to put said at least one applicant in communication with a customer service representative if the system confirms that said at least one applicant did not submit an application to said client.

4. An automated system for detecting fraudulent applications among a plurality of applications filed by various applicants, comprising:
a processor;
a data storage medium operatively coupled with said processor that is capable of at least temporarily storing application data provided by one or more clients;
an identification database comprising the names of individuals and contact information relating to said individuals; said identification database being operatively coupled with said processor;
means for accessing a network operatively coupled with said processor; and
software operative on said processor to:
a) receive application data from one or more clients for at least one applicant;
b) compare the applicant data for said at least one applicant with said identification database;
c) determine whether or not said application data for said at least one applicant matches at least a portion of said identification database for at least one individual;
d) initiate contact with said at least one applicant over said network;
e) present said at least one applicant with an identity question in an attempt to confirm the identity of the individual;
f) receive a response from said at least one applicant regarding said identity question;
g) present said at least one applicant with an application question in an attempt to confirm whether or not said at least one applicant submitted an application to said client;
h) attempt to receive a response from said at least one applicant regarding said application question; and
i) leave a message for said at least one applicant that includes reply contact information, so that said at least one applicant may later confirm whether or not said at least one applicant submitted an application to said client, if the system does not receive an affirmative response from said at least one applicant to said application question.

5. The system of claim 4 wherein said software is further operative to leave a message for said at least one applicant that includes reply contact information, if the system does not receive an affirmative response from said at least one applicant to said identity question.

6. The system of claim 4 wherein said software is further operative to record communications between the system and said at least one applicant on said data storage medium.

7. An automated system for detecting fraudulent applications among a plurality of applications filed by various applicants, comprising:
a processor;
a data storage medium operatively coupled with said processor that is capable of at least temporarily storing application data provided by one or more clients;
an identification database comprising the names of individuals and contact information relating to said individuals; said identification database being operatively coupled with said processor;
means for accessing a publicly switched telephone network operatively coupled with said processor; and
software operative on said processor to:
a) receive application data from one or more clients for at least one applicant; said application data comprising at least a name and contact information for said at least one applicant;
b) compare the application data for said at least one applicant with said identification database;
c) determine whether or not said application data for said at least one applicant matches at least a portion of said identification database for at least one individual;
d) initiate contact with said at least one applicant over said publicly switched telephone network;
e) present said at least one applicant with an identity question in an attempt to confirm the identity of the applicant;
f) receive a response from said at least one applicant regarding said identity question;
g) present said at least one applicant with an application question in an attempt to confirm whether or not said at least one applicant submitted an application to said client;
h) receive a response from said at least one applicant regarding said application question; and
i) ask said at least one individual to confirm the contact information that should be used by said client, if the system first determiners that said application data for said at least one applicant does not match a name and contact information within said identification database and the system has confirmed that said at least one applicant submitted an application to said client.

8. The system of claim 7 wherein said software is further operative to put said at least one applicant in communication with a customer service representative if said at least one applicant chooses to use contact information that is not provided within said application data or said identification database.

9. The system of claim 7 wherein said software is further operative to put said at least one applicant in communication with a customer service representative if said at least one applicant, if the system receives a response to said application question that said at least one applicant did not submit an application to said client.

10. The system of claim 7 wherein said software is further operative to record communications between the system and said at least one applicant on said data storage medium.

11. An automated system for detecting fraudulent applications among a plurality of applications filed by various applicants, comprising:
   a processor;
   a data storage medium operatively coupled with said processor that is capable of at least temporarily storing application data provided by one or more clients;
   an identification database comprising the names of individuals and contact information relating to said individuals; said identification database being operatively coupled with said processor;
   means for accessing a publicly switched telephone network operatively coupled with said processor; and
   software operative on said processor to:
   a) receive application data from one or more clients for at least one applicant; said application data comprising at least a name and contact information for said at least one applicant;
   b) compare the application data for said at least one applicant with said identification database;
   c) determine whether or not said application data for said at least one applicant matches at least a portion of said identification database for at least one individual;
   d) initiate contact with said at least one applicant over said publicly switched telephone network;
   e) present said at least one applicant with an identity question in an attempt to confirm the identity of the applicant;
   f) attempt to receive a response from said at least one applicant regarding said identity question;
   g) present said at least one applicant with an application question in an attempt to confirm whether or not said at least one applicant submitted an application to said client;
   h) attempt to receive a response from said at least one applicant regarding said application question; and
   i) leave a message for said at least one applicant that includes reply contact information, if the system does not receive an affirmative response from said at least one applicant to either said identity question or said application question.

* * * * *